Nov. 3, 1936.  D. FREDIANI  2,059,514
COMBINED GRINDING AND WEIGHING MACHINE
Filed March 16, 1935
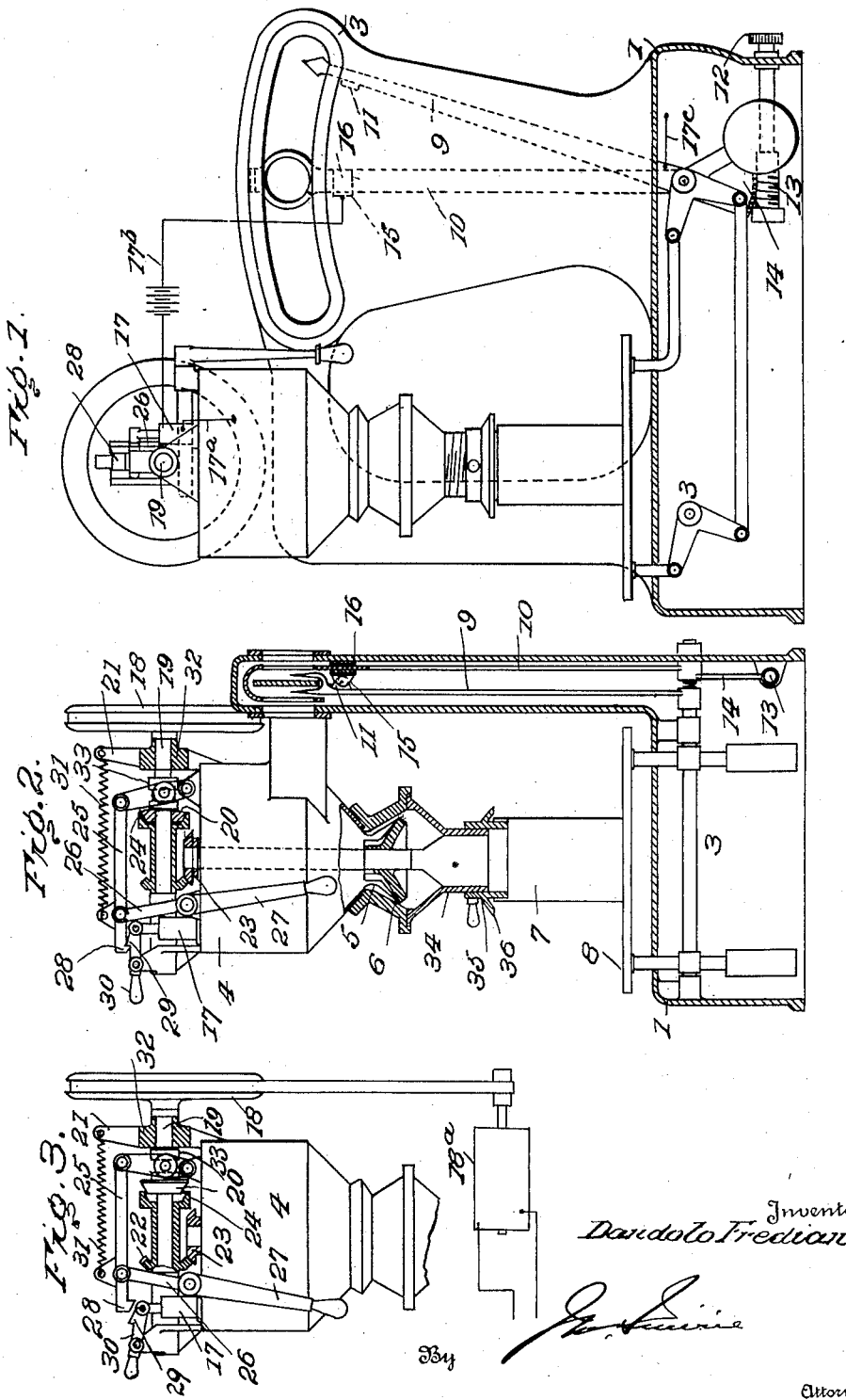

Patented Nov. 3, 1936

2,059,514

UNITED STATES PATENT OFFICE 2,059,514

COMBINED GRINDING AND WEIGHING MACHINE

Dandolo Frediani, Sao Paulo, Brazil, assignor to Pedro Menten and Francisco Menten, Sao Paulo, Brazil Application March 16, 1935, Serial No. 11,504
In Brazil April 28, 1934

1 Claim. (Cl. 249—62)

The present invention relates to a grinding mill, structurally combined with scales, which can be provided with an automatic stop, for the purpose of grinding and at the same time weighing predetermined quantities of products.

The invention has, among other advantages, that of requiring small space, that of effecting a considerable saving of time for the operator, besides being adapted for the weighing of correct predetermined quantities, thereby avoiding waste, which advantage is obtained when the machine is equipped with an automatic stop which instantly interrupts the grinding operation and the flow of the ground product to the container placed on the scales, at the moment when the ground product in the container reaches the pre-established weight of each operation. According to the usual weighing process the accuracy depends on the eyesight of the operator, which, besides requiring more time to perform the weighing operation, is open to fraud, especially in highly sensitive scales, whose indicating arms rapidly oscillate above and below the weight-marks, thereby rendering the visual control by customer, a difficult one.

The subjoined drawing shows one of the modes of execution of the present invention.

Fig. 1 is a front view of assemblage of a combined grinding mill and scales.

Fig. 2 is a vertical cross-section of the assemblage in operation position; and

Fig. 3 is a detail, in section, of the mill driving system and the stop device which can be controlled by hand or automatically controlled by the scales.

In the attached drawing, reference number 1 denotes a base on which is mounted the mill 2, inside of which base is placed the weighing means 3. The product contained in the hopper is ground by means of the conical grinders 5 and 6, whence it flows into container 7, which container may consist of the package or wrapper means, in which the ground product is to be put up. Said container is placed on the platform of the scales 8, which is a characteristic feature of the invention, different from the usual way of performing said operation, and permits the instant weighing of the ground product in proportion as it drops from the grinders.

As the mode of operation of a mill and scales is assumed to be known, any explanation in this respect can be dispensed with.

The automatic stop device works as follows: besides the indicator arm 9 a second arm 10 is provided and moves over the same dial, the arm 9 being fitted with an electric contact 11. The purpose of arm 10 is to predetermine the amount of product to be ground. The position of said arm 10 is adjusted by turning a handle 12 which engages a worm-gear 13, which in turn engages the cogged segment 14 which causes said arm 10 to move over on the dial in a known manner, said arm 10 being likewise provided with an electric contact 15 attached to an insulated block 16. 17 designates an electro magnet from which leads a wire 17ª connected to the main frame. A second wire 17ᵇ leads from the magnet and is attached to the contact 15 on lever 10, a battery or other source of electrical energy being interposed in wire 17ᵇ. A wire 17ᶜ leads from arm 9 and is connected to the frame, hence when the contacts 11 and 15 are brought together, the electro magnet is energized. When the weight of the ground product causes the indicator arm of the scales to reach on the dial the point marked by the movable arm 10, contact 11 engages contact 15 and forms an electric circuit acting on an electro-magnet 17 which disconnects the grinding system and thereby stops the grinding operation and the flow of the ground product into the container 7 on the platform of the scales.

The automatic stop operates as follows: A pulley 18 is mounted on shaft 19, the latter being driven by an electric motor or the like conventionally illustrated at 18ª. On shaft 19 is splined a sliding sleeve 20 so as to permit of its free axial movement. One end of the sliding sleeve 20 is provided with a cone forming part of a clutch, while the other end thereof is provided with an annular groove in which fits the fork of a lever 21 for the purpose of causing the sleeve to move axially on its own shaft. On the same shaft there is loosely mounted a sleeve having on one end a bevel gear 22 which meshes with a bevel gear 23 on a vertical grinder shaft to impart motion to a grinder 6, said loose sleeve having on its opposite end a clutch member which cooperates with the clutch member on the sleeve 20. The fork 21 is controlled by means of a rod 25 which is pivoted at one end to the fork lever and is also pivoted to the upper end 26 of a pivotally mounted starting lever 27.

In order to operate the machine, lever 27 is first placed in the position shown on Fig. 2, thereby throwing the clutch members 20 and 24 together and through the bevel gears 22 and 23 causing the grinder 6 to rotate. The rod 25, on the end opposite to that which engages with the fork 21, is provided with a cam lug 28 which cooperates with a retaining lug 29 on lever 30 and retains the rod in operative position during the grinding and weighing operation. The moment the weight of the ground product reaches the pre-fixed quantity marked by indicating arm 10, the contacts 11 and 15 on arms 9 and 10 respectively engage with each other so as to close the circuit which engages the electro-magnet 17, and the latter pulls on lever 30 and releases arm 25 and through the action of spring 31 the clutch sleeve 20 is moved on its shaft and the clutch disengaged to stop the grinding operation. This operation, by the way, can also be performed by hand as by operating handle 30.

As the container 7 is withdrawn from the platform of the scales 8, the arm 9 will return to its starting point on the dial and will at the same time interrupt the circuit previously established by the contacts 11 and 15, causing the core of the electro-magnet and the lever 30 to assume normal position.

In order to keep the container 7 in a stationary position on the platform of the scales 8, so that the ground product will pour into said container, the mouth 34 is fitted with a sleeve 35; said spout and sleeve are provided with a high pitch thread, so that, by turning the sleeve around the spout, the sleeve is urged downward, so that its lower end is partly introduced into the container 7. The rim 36 of said sleeve serves to prevent the admission of dust or impurities into the container while being filled.

The invention can be manufactured of any materials suitable for the construction of machines for the specified purposes.

It is understood that the word "grind" is not used, in this specification, in a limited sense, but in its amplest meaning; further that the invention relates likewise to crushing, granulating and breaking machines in general; and further that the invention is not limited by the nature of the products to be worked by the machine, as said products can be either vegetable, animal or mineral.

I claim:

A combined grinding and weighing machine, including a grinder, a weighing platform below the delivery outlet of the grinder, an indicating element controlled by the platform for indicating the weight thereon, a manually operable element to be set at a predetermined weight and to be engaged by the indicating element when the predetermined weight has been reached, circuit switching means cooperatively controlled by said elements, a motor for operating the grinding machine, a clutch for controlling the power of the motor to the grinding machine, a member for shifting the clutch for disconnecting the motor, a latch to hold the shifting means to maintain motor drive, electrically operated means for releasing the latch, said means being in circuit with and controlled by the switch set by the indicating and manually operable elements, and means for manually releasing the latch at will.

DANDOLO FREDIANI.